(12) United States Patent
Schwarz et al.

(10) Patent No.: US 8,781,900 B2
(45) Date of Patent: Jul. 15, 2014

(54) METHOD AND SYSTEM OF PROVIDING INFORMATION TO AN OCCUPANT OF A VEHICLE

(75) Inventors: Stanley G. Schwarz, Indialantic, FL (US); Jeffrey H. Frank, Littleton, CO (US); Christopher M. Macheca, Centennial, CO (US); Gerald A. Morgan, Littleton, CO (US); Franco Chirico, Highlands Ranch, CO (US)

(73) Assignee: **Gordon*Howard Associates, Inc.**, Littleton, CO (US)

( * ) Notice: Subject to any disclaimer, the term of this patent is extended or adjusted under 35 U.S.C. 154(b) by 87 days.

(21) Appl. No.: 13/229,326

(22) Filed: Sep. 9, 2011

(65) Prior Publication Data

US 2013/0066720 A1 Mar. 14, 2013

(51) Int. Cl.
*G06Q 30/00* (2012.01)
*G08G 1/0962* (2006.01)
*G06Q 30/02* (2012.01)

(52) U.S. Cl.
CPC .............. *G08G 1/0962* (2013.01); *G06Q 30/02* (2013.01)
USPC ................... 705/14.63; 705/14.25; 705/14.64; 705/14.66; 705/14.67

(58) Field of Classification Search
USPC ........... 705/14.63, 14.25, 14.64, 14.66, 14.67
See application file for complete search history.

(56) References Cited

U.S. PATENT DOCUMENTS

| | | | |
|---|---|---|---|
| 4,335,370 A | 6/1982 | Scalley et al. | |
| 4,592,443 A | 6/1986 | Simon | |
| 4,624,578 A | 11/1986 | Green | |
| 4,688,026 A | 8/1987 | Scribner et al. | |
| 4,700,296 A | 10/1987 | Palmer, Jr. et al. | |
| 4,738,333 A | 4/1988 | Collier et al. | |
| 4,800,590 A | 1/1989 | Vaughan | |
| 5,014,206 A | 5/1991 | Scribner et al. | |
| 5,132,968 A | 7/1992 | Cephus | |
| 5,228,083 A | 7/1993 | Lozowick et al. | |
| 5,426,415 A | 6/1995 | Prachar et al. | |
| 5,490,200 A | 2/1996 | Snyder et al. | |
| 5,495,531 A | 2/1996 | Smiedt | |
| 5,510,780 A | 4/1996 | Norris et al. | |

(Continued)

FOREIGN PATENT DOCUMENTS

| | | |
|---|---|---|
| EP | 1557807 | 7/2005 |
| WO | 9616845 | 6/1996 |

(Continued)

OTHER PUBLICATIONS

U.S. 5,699,633, 10/1999, Roser (withdrawn).

(Continued)

*Primary Examiner* — Naresh Vig
(74) *Attorney, Agent, or Firm* — Mark E. Scott; Michelle N. Safer; Conley Rose, P.C.

(57) ABSTRACT

Providing information to an occupant of a vehicle. At least some of the illustrative embodiments are methods including: identifying an occupant of a vehicle, the identifying creates an indicia of occupant identity; determining an identity of the vehicle, the determining creates an indicia of vehicle identity; tracking location of the vehicle when occupied by the occupant; and providing information to the occupant, the information selected based on the indicia of occupant identity, the indicia of vehicle identity, and/or the locations of vehicle when occupied by the occupant.

32 Claims, 5 Drawing Sheets

(56) References Cited

U.S. PATENT DOCUMENTS

| | | | |
|---|---|---|---|
| 5,619,573 A | 4/1997 | Brinkmeyer et al. | |
| 5,673,318 A | 9/1997 | Bellare et al. | |
| 5,708,712 A | 1/1998 | Brinkmeyer et al. | |
| 5,775,290 A | 7/1998 | Staerzi et al. | |
| 5,797,134 A | 8/1998 | McMillan et al. | |
| 5,818,725 A | 10/1998 | McNamara et al. | |
| 5,819,869 A | 10/1998 | Horton | |
| 5,898,391 A | 4/1999 | Jefferies et al. | |
| 5,917,405 A | 6/1999 | Joao | |
| 5,970,143 A | 10/1999 | Schneier et al. | |
| 6,025,774 A | 2/2000 | Forbes | |
| 6,026,922 A | 2/2000 | Horton | |
| 6,032,258 A | 2/2000 | Godoroja et al. | |
| 6,064,970 A | 5/2000 | McMillan et al. | |
| 6,088,143 A | 7/2000 | Bang | |
| 6,130,621 A | 10/2000 | Weiss | |
| 6,157,317 A | 12/2000 | Walker | |
| 6,185,307 B1 | 2/2001 | Johnson, Jr. | |
| 6,195,648 B1 | 2/2001 | Simon et al. | |
| 6,249,217 B1 | 6/2001 | Forbes | |
| 6,278,936 B1 | 8/2001 | Jones | |
| 6,353,776 B1 | 3/2002 | Rohrl et al. | |
| 6,370,649 B1 | 4/2002 | Angelo et al. | |
| 6,380,848 B1 | 4/2002 | Weigl et al. | |
| 6,401,204 B1 | 6/2002 | Euchner et al. | |
| 6,429,773 B1 | 8/2002 | Schuyler | |
| 6,489,897 B2 | 12/2002 | Simon | |
| 6,587,739 B1 | 7/2003 | Abrams et al. | |
| 6,601,175 B1 | 7/2003 | Arnold et al. | |
| 6,611,201 B1 | 8/2003 | Bishop et al. | |
| 6,611,686 B1 | 8/2003 | Smith et al. | |
| 6,615,186 B1* | 9/2003 | Kolls | 705/14.51 |
| 6,665,613 B2 | 12/2003 | Duvall | |
| 6,714,859 B2 | 3/2004 | Jones | |
| 6,717,527 B2 | 4/2004 | Simon | |
| 6,741,927 B2 | 5/2004 | Jones | |
| 6,804,606 B2 | 10/2004 | Jones | |
| 6,812,829 B1 | 11/2004 | Flick | |
| 6,816,089 B2 | 11/2004 | Flick | |
| 6,816,090 B2 | 11/2004 | Teckchandani et al. | |
| 6,828,692 B2 | 12/2004 | Simon | |
| 6,868,386 B1 | 3/2005 | Henderson et al. | |
| 6,870,467 B2 | 3/2005 | Simon | |
| 6,873,824 B2 | 3/2005 | Flick | |
| 6,888,495 B2 | 5/2005 | Flick | |
| 6,917,853 B2 | 7/2005 | Chirnomas | |
| 6,924,750 B2 | 8/2005 | Flick | |
| 6,950,807 B2 | 9/2005 | Brock | |
| 6,952,645 B1 | 10/2005 | Jones | |
| 6,961,001 B1 | 11/2005 | Chang et al. | |
| 6,972,667 B2 | 12/2005 | Flick | |
| 6,985,583 B1 | 1/2006 | Brainard et al. | |
| 6,993,658 B1 | 1/2006 | Engberg et al. | |
| 7,005,960 B2 | 2/2006 | Flick | |
| 7,015,830 B2 | 3/2006 | Flick | |
| 7,020,798 B2 | 3/2006 | Meng et al. | |
| 7,031,826 B2 | 4/2006 | Flick | |
| 7,031,835 B2 | 4/2006 | Flick | |
| 7,039,811 B2 | 5/2006 | Ito | |
| 7,053,823 B2 | 5/2006 | Cervinka et al. | |
| 7,061,137 B2 | 6/2006 | Flick | |
| 7,091,822 B2 | 8/2006 | Flick et al. | |
| 7,103,368 B2* | 9/2006 | Teshima | 455/456.3 |
| 7,123,128 B2 | 10/2006 | Mullet et al. | |
| 7,124,088 B2 | 10/2006 | Bauer et al. | |
| 7,133,685 B2 | 11/2006 | Hose et al. | |
| 7,149,623 B2 | 12/2006 | Flick | |
| 7,205,679 B2 | 4/2007 | Flick | |
| 7,224,083 B2 | 5/2007 | Flick | |
| 7,266,507 B2 | 9/2007 | Simon et al. | |
| 7,299,890 B2 | 11/2007 | Mobley et al. | |
| 7,323,982 B2 | 1/2008 | Staton et al. | |
| 7,327,250 B2 | 2/2008 | Harvey | |
| 7,379,805 B2* | 5/2008 | Olsen et al. | 701/50 |
| 7,389,916 B2 | 6/2008 | Chirnomas | |
| 7,561,102 B2 | 7/2009 | Duvall | |
| 7,823,681 B2 | 11/2010 | Crespo et al. | |
| 7,873,455 B2 | 1/2011 | Arshad et al. | |
| 7,877,269 B2 | 1/2011 | Bauer et al. | |
| 7,930,211 B2* | 4/2011 | Crolley | 705/14.64 |
| 8,018,329 B2 | 9/2011 | Morgan et al. | |
| 8,095,394 B2 | 1/2012 | Nowak et al. | |
| 8,140,358 B1 | 3/2012 | Ling et al. | |
| 8,217,772 B2 | 7/2012 | Morgan et al. | |
| 8,370,027 B2 | 2/2013 | Pettersson et al. | |
| 2001/0040503 A1 | 11/2001 | Bishop | |
| 2002/0019055 A1 | 2/2002 | Brown | |
| 2002/0193926 A1 | 12/2002 | Katagishi et al. | |
| 2003/0036823 A1 | 2/2003 | Mahvi | |
| 2003/0151501 A1 | 8/2003 | Teckchandani et al. | |
| 2003/0191583 A1 | 10/2003 | Uhlmann et al. | |
| 2004/0088345 A1 | 5/2004 | Zellner et al. | |
| 2004/0153362 A1 | 8/2004 | Bauer et al. | |
| 2004/0176978 A1 | 9/2004 | Simon et al. | |
| 2004/0177034 A1 | 9/2004 | Simon et al. | |
| 2004/0203974 A1 | 10/2004 | Seibel | |
| 2004/0204795 A1 | 10/2004 | Harvey et al. | |
| 2004/0239510 A1 | 12/2004 | Karsten | |
| 2005/0017855 A1 | 1/2005 | Harvey | |
| 2005/0033483 A1 | 2/2005 | Simon et al. | |
| 2005/0134438 A1 | 6/2005 | Simon | |
| 2005/0162016 A1 | 7/2005 | Simon | |
| 2005/0270178 A1 | 12/2005 | Ioli | |
| 2006/0059109 A1 | 3/2006 | Grimes | |
| 2006/0108417 A1 | 5/2006 | Simon | |
| 2006/0111822 A1 | 5/2006 | Simon | |
| 2006/0122748 A1 | 6/2006 | Nou | |
| 2006/0136314 A1 | 6/2006 | Simon | |
| 2007/0010922 A1 | 1/2007 | Buckley | |
| 2007/0176771 A1 | 8/2007 | Doyle | |
| 2007/0185728 A1 | 8/2007 | Schwarz et al. | |
| 2007/0194881 A1 | 8/2007 | Schwarz et al. | |
| 2008/0114541 A1 | 5/2008 | Shintani et al. | |
| 2008/0162034 A1 | 7/2008 | Breen | |
| 2008/0221743 A1 | 9/2008 | Schwarz et al. | |
| 2009/0043409 A1 | 2/2009 | Ota | |
| 2009/0182216 A1 | 7/2009 | Roushey, III | |
| 2010/0148947 A1 | 6/2010 | Morgan et al. | |
| 2010/0268402 A1 | 10/2010 | Schwarz et al. | |
| 2011/0050407 A1 | 3/2011 | Schoenfeld et al. | |
| 2011/0057800 A1 | 3/2011 | Sofer | |
| 2011/0084820 A1 | 4/2011 | Walter et al. | |

FOREIGN PATENT DOCUMENTS

| | | |
|---|---|---|
| WO | 2007092272 | 8/2007 |
| WO | 2007092287 | 8/2007 |
| WO | WO 2010/068438 A2 | 6/2010 |

OTHER PUBLICATIONS

On Time Payment Protection Systems, printed Jan. 2, 2004 from www.ontime-pps.com/how.html.

Aircept Products, printed Jan. 2, 2004 from www. aircept. com/products.html.

How PayTeck Works, printed Jan. 2, 2004 from www. payteck.cc/aboutpayteck.html.

Article: "Pager Lets You Locate Your Car, Unlock and Start It", published Dec. 10, 1997 in USA Today.

Article: "Electronic Keys Keep Tabs on Late Payers", published Sep. 22, 1997 in Nonprime Auto News.

Article: "PASSTEC Device Safely Prevents Vehicles from Starting", published Jul. 19, 1999 in Used Car News.

Payment Clock Disabler advertisement, published, May 18, 1998.

Secure Your Credit & Secure Your Investment (Pay Teck advertisement), printed Jan. 2, 2004 from www. payteck.cc.

iMetrik Company Information, printed Dec. 21, 2006 from imetrik. com.

(56) References Cited

OTHER PUBLICATIONS

About C-CHIP Technologies, printed Dec. 21, 2006 from www.c-chip.com.
Hi-Tech tools to solve traditional problems, printed Dec. 21, 2006 from www.c-chip.com.
C-Chip Technologies Products: Credit Chip 100, Credit Chip 100C, Credit Chip 200, printed Dec. 21, 2006 from www. c-chip.com.

The Credit Chip 100, printed Dec. 21, 2006 from www.c-chip.com.

* cited by examiner

METHOD AND SYSTEM OF PROVIDING INFORMATION TO AN OCCUPANT OF A VEHICLE

BACKGROUND

Advertisers are always looking for new and innovative ways to provide advertising information to consumers, and the growing trend is targeted marketing. Thus, any system or method that enables advertisers to provide targeted advertisements to consumers would provide a competitive advantage in the marketplace.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

"Remote" or "remotely", relative to a vehicle, shall mean a distance of greater than one kilometer.

"Identifying" shall mean making a determination as to the identity of a person or device, but shall not require determining an absolute identity. For example, determining that the person or device was not previously identified shall still be considered as identifying.

"Portable electronic device" shall mean a handheld device that has the ability to communicate over a wireless data network, and is not affixed to a vehicle. The fact that a portable wireless device may dock with a docking station while in a vehicle shall not obviate the portable status.

"Affixed" with respect to a vehicle shall mean that the portable device is mechanically or electrically coupled to the vehicle such that the device is not physically accessible by an occupant properly seated in the vehicle.

"Location" shall mean a geographic location, but shall not be read to require precise location. Resolution on location as large as a state, county, or city shall still be considered location for purposes of the claims.

"Advertising" as a noun, and "advertisement(s)" shall mean information about a good or service of a specific business. "Advertising" as a noun and "advertisement(s)" shall not encompass maintenance information about an automobile (e.g., that an automobile is due for an oil change, or the automobile is due for a tire rotation).

DETAILED DESCRIPTION

The following discussion is directed to various embodiments of the invention. Although one or more of these embodiments may be preferred, the embodiments disclosed should not be interpreted, or otherwise used, as limiting the scope of the disclosure or claims. In addition, one skilled in the art will understand that the following description has broad application, and the discussion of any embodiment is meant only to be exemplary of that embodiment, and not intended to intimate that the scope of the disclosure or claims is limited to that embodiment.

Figure 1:
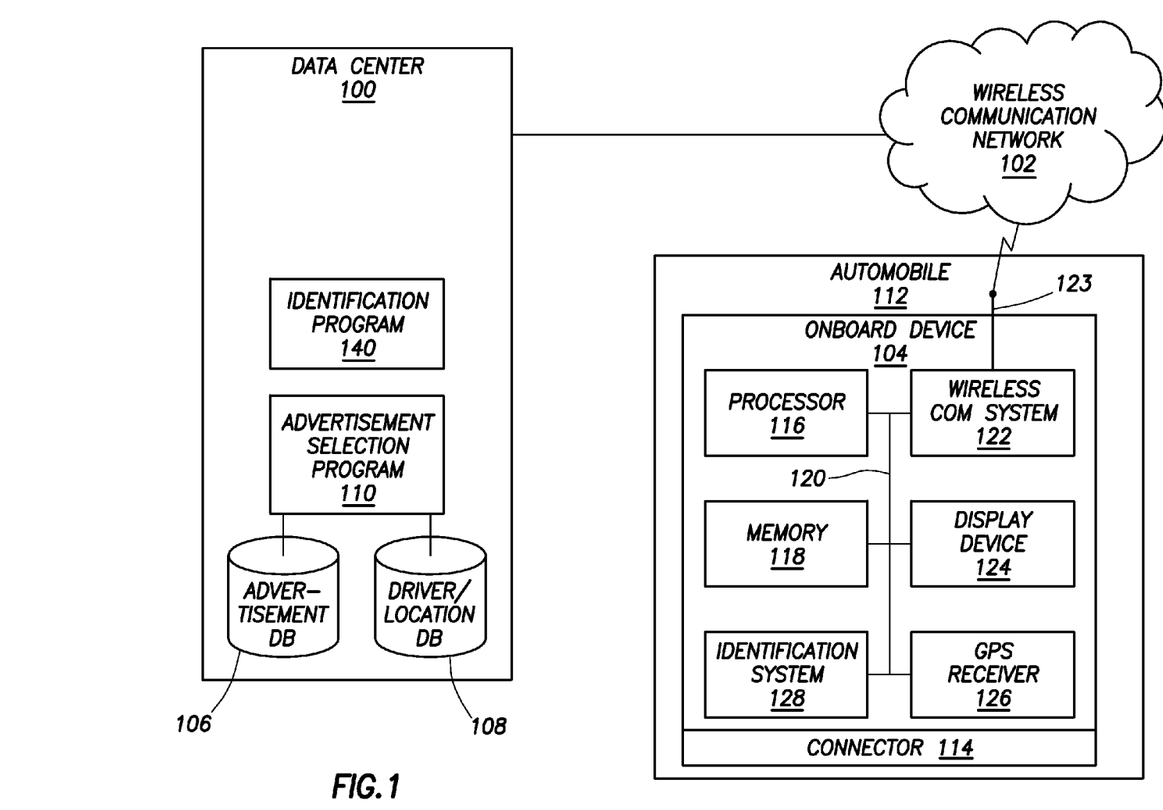
FIG. 1 shows a block diagram of a system in accordance with at least some embodiments.

The various embodiments are directed to systems and methods of providing targeted advertising to one or more consumers in a vehicle. The developmental context is providing advertising to the driver of a vehicle, and thus the specification will be based on the developmental context; however, the developmental context shall not be read as a limitation as the applicability of the various embodiments, as advertising may be provided to any occupant of the vehicle in other embodiments. The advertising provided is selected based on an identity of the driver of the vehicle, as well as various locations of the vehicle when driven by the particular driver. FIG. 1 shows a system in accordance with at least some embodiments. In particular, the main elements of the illustrative system of FIG. 1 comprise a data center 100, a wireless data network 102, and an onboard device 104. Each will be discussed in turn.

The data center 100 may comprise one or more computer systems executing software instructions. In some cases, the one or more computer systems of the data center may all be located at a single location; however, in other cases the computer systems of the data center may be remotely located from one another, yet functioning as a data center. In a particular embodiment, one or more computer systems of the data center may be "cloud" computer systems provided under contract from a cloud computing service provider, thus the physical location of the computer systems may not be precisely known to the data center operator, or may change daily or even hourly depending on the amount of computing resources used.

In accordance with various embodiments the data center 100 further comprises an advertisement database 106, a driver/location database 108, and an advertisement selection program 110. The advertisement database 106 comprises advertisements for one or more businesses. The advertisements may take many forms. In some cases the advertisements may be informational, such as advertisements indicating a current or upcoming sale. In other cases, the advertisements may comprise electronic images of coupons or other incentives for short term purchases by the consumer. The advertisement selection program 110 may select one or more advertisements from the advertisement database 106, the selection based on any or all of: previous routes driven by the driver in the vehicle, the previous routes stored on the driver/location database 108; identity of the driver of the vehicle; and/or current location of the vehicle. The selection of advertisements, as well as delivery to the driver, is discussed more below.

In the illustration of FIG. 1, the onboard device 104 is coupled to a vehicle, such as automobile 112. That is, the onboard device 104 is mechanically and electrically coupled to the automobile 112, and in some cases at least a portion of the onboard device 104 is not physically accessible by an occupant properly seated in the vehicle. In many cases, some or all the onboard device 104 may reside under or within the dashboard of the automobile 112. In other cases, the onboard device 104 may be at any suitable location within the car, such as in an electrical compartment under the hood, or within the luggage compartment. In a particular embodiment, the onboard device 106 both mechanically and electrically couples to the automobile 108 by way of a connector 114. That is, connector 114 may provide mechanical support that holds the onboard device 104 in place, and by way of the connector 114 the onboard device 104 may electrically couple to other components of the automobile 112, such as the onboard computer or starter solenoid. In one embodiment, the connector 114 is an onboard diagnostic (OBD) version two (hereafter just OBD-II) port. Coupling the onboard device 104 to the OBD-II port thus gives the onboard device 104 the ability to communicate with one or more computer systems of the automobile 112.

The onboard device 104 illustrated in FIG. 1 comprises a processor 116 coupled to a memory 118 by way of a bus 120. The memory 118 stores programs executed by the processor 116, and in some cases may be the working memory for the processor 116. For example, the memory 118 may be random access memory (RAM) (e.g., dynamic random access memory (DRAM), flash memory), programmable read-only memory (PROM), or combinations. While FIG. 1 shows the processor 116 and memory 118 as separate components, in other cases the processor and memory are an integrated component, such as microcontroller. The processor 116 may communicate with sub-systems of the automobile over the connector 114, such as computer systems of the automobile. The onboard device 104 configured to couple to the OBD-II port may also have the ability to read or determine data associated with the vehicle, such as determining the identity of the vehicle (e.g., by reading the VIN number), and may also have the ability to command computer systems of the automobile to disable certain functions (e.g., starting, spark ignition, fuel system) such that automobile may be disabled at the command of the onboard device 104.

The onboard device 104 further comprises a wireless communication system 122 coupled to the processor 116. By way of the wireless communication system 122, programs executed by the processor 116 may communicate with other devices. In some embodiments, the wireless communication system 122 is the system over which data transmission to and from the data center 100 may take place, as illustrated by antenna 123 coupled to the wireless communication network 102 and thus the data center 100. The wireless communication system 122 thus implements a wireless communication system and/or protocol (i.e., radio frequency communication by way of electromagnetic waves propagating through air). Any suitable communication protocol may be implemented by the wireless communication system 122 and the wireless communication network 102, such as Global System for Mobile communications (GSM) compliant protocol, a General Packet Radio Service (GPRS) compliant protocol, or a Personal Communications Service (PCS) compliant system. In one embodiment the wireless communication system 122 will employ only data communications, but in other embodiments audio and/or voice communication from the data center 100 may be implemented.

Still referring to FIG. 1, illustrative onboard device 104 further comprises a display device 124 coupled to the processor 116. The display device 124 may be any display device upon which text and/or images may be formed. While in some embodiments portions of the onboard device 104 may not be accessible by the driver when properly seated, in a particular embodiment at the least the display device 124 is installed in such a way that the driver and/or other occupants of the automobile can see the display when properly seated. Though not specifically shown in FIG. 1, the display device may be overlaid with a transparent touch sensitive device such that the onboard device 104 implements "touch screen" functionality.

The illustrative onboard device 104 further comprises a GPS receiver 126. The GPS receiver 126 receives signals from an array of GPS satellites orbiting the earth, and based on timing associated with arrival of those signals, a location of the onboard device 104 can be determined. In some cases, the GPS receiver 126 has sufficient functionality to calculate location, and thus the data passed to processor 116 may be a direct indication of location. In other cases, the functionality to determine location may be shared between the GPS receiver 126 and software executing on the processor 116. That is, the GPS receiver 126 may receive the plurality of GPS signals and pass the information to a program on the processor 116, which program may then make the determination as to location of the onboard device 104, and thus the location of the automobile 112.

In other embodiments, location determinations by the onboard device may be by mechanisms other than strictly GPS signals. For example, in some embodiments location may be fully or partially determined based on the signals of the wireless communication network 102 (which in some cases is a cellular telephone network). For example, location may be broadly determined by knowing the location of a particular tower of the wireless communication network 102 with which the onboard device 104 is communicating. In other cases, location may be determined by triangulation if multiple towers are in communication range of the wireless communication system 122 of the onboard device 104. In some cases, the determination of location based on the wireless communication network is performed by the processor 116 of the onboard device, but in other cases the tower information is sent to the data center 100 to perform the bulk of the location calculations.

Still referring to FIG. 1, the illustrative onboard device further comprises an identification system 128. The identification system 128 may take many forms, examples of which are discussed more below. So as not to unduly complicate the discussion, consider for now that the identification system 128 can determine identity of the driver of the automobile in some form. It is noted, however, that a determination of an exact identity is not recited or required. Even a determination that the particular driver has not been previously identified may be sufficient in many embodiments.

When the driver approaches and/or enters the automobile 112, the onboard device 104, by way of the identification system 128, indentifies the driver thus creating indicia of driver identity. Moreover, the onboard device 104 determines an identity of the vehicle, thereby creating indicia of vehicle identity. It is noted that, in some embodiments, the onboard device 104 need not re-identify the automobile each and every time a driver approaches and/or enters the automobile. In some cases, the onboard device 104 may only identify the automobile when the onboard device 104 is initially installed. In other cases, the onboard device 104 may identify the vehicle at any suitable time, such as after a loss of power that could indicate the onboard device 104 has been moved between automobiles.

Once the driver and the automobile have been identified, the onboard device 104, by way of the GPS receiver 126, tracks the location of the automobile as driven by the driver by determining a series of locations of the automobile over time. Tracking location can take many forms. In one embodiment, the onboard device 104 tracks the vehicle with high precision, thus one may be able to identify the street and block at which the automobile is passing at any given time (though the onboard device may not necessarily have or contain street level databases). In other cases, the onboard device 104 may act only to determine the end-points of each trip. Because the end-point of the previous trip is, by nature, the beginning point of the next trip, the onboard device 104 can determine the beginning and ending location of each trip, but not necessarily the route taken. In yet still further embodiments, the spatial resolution of the tracking may be large, such as a city, state, or country. For example, in one embodiment the onboard device may determine position with enough accuracy only to determine the state within which the automobile is currently being driven. In a particular embodiment, the onboard device 104 sends the identity of the driver and automobile to the data center 100 by way of the wireless communication network 102. The data center 100, in turn, may store the information in the driver/location database 108.

The advertisement selection program 110 selects advertisements from the advertisement database 106, and sends the advertisements to the onboard device 104 by way of the wireless communication network 102. The onboard device 104, in turn, provides the information of the advertisement to the driver in any suitable form, such as by displaying the advertisement on the display device 124.

Consider, for purposes of explanation, a driver of automobile 112 drives to work every business day along substantially the same route. Over time, the driver/location database 108 may contain enough information to reliably predict the path of travel of the automobile 104. With that history, on a particular day the advertisement selection program 110 may select an advertisement from the advertisement database 106 for a business that resides along the expected route of travel, and the advertisement is delivered to the onboard device 104. As the driver approaches the business for which the advertisement has been downloaded, the onboard device 104 may provide the advertisement to the driver by way of the display device 124. For example, for morning commutes business such as restaurants, doughnut shops, and coffee shops, just to name a few, may provide pinpoint advertising to the driver as a potential customer.

In some cases, the location determined by the onboard device 104 may only be a position on the face of the earth, for example latitude and longitude. The data center 100, receiving a stream of locations from the onboard device 104, may correlate to streets and addresses. In other cases, the onboard device 104 may have sufficient memory and computing functionality to not only determine position in a latitude and longitude sense, but also to correlate the position to cities, streets, block numbers and addresses. Thus, in some cases the data center 100, particularly the advertisement selection program 110, sends the advertisement at the desired time based on a stream of location indications sent from the onboard device 104. In other cases, the data center 100 sends the advertisement to the onboard device 104 with an indication of at what upcoming location the advertisement should be provided to the driver. The onboard device 104, in turn, holds the advertisement (e.g., in memory 118) until the automobile is at or near the predetermined location, and then provides the advertisement without further prompting by the data center 104.

The selection of advertisements, however, is not limited to merely businesses along the expected path of travel. In yet still further embodiments, the advertisement selection program 110 may select advertisements based on previous locations at which the driver and automobile have stopped. For example, if the advertisement selection program 110 determines the driver stops most mornings at a particular business (e.g., a coffee shop), the advertisement selection program may select an advertisement based on the knowledge. The illustrative advertisement selected and provided may be with respect to the business where the driver has previously stopped (e.g., advertising a customer loyalty special or sale), or from a competing good or service provider as an attempt to lure the customer away.

In yet still further cases, the advertisement selected and provided to the onboard device 104 for delivery to the driver may be selected based on the automobile. If the automobile is a Ford® brand product, for example, the advertisement selection program may select advertisements for goods and services related to the automobile 112, such as service specials (e.g., oil change specials at the dealership) trade-in rebate programs, and the like. The advertisements selected based on the automobile may likewise be position based, providing the advertisements to the driver as the driver and automobile 112 approach the dealership.

The identity of the driver may also be taken into consideration by the advertising selection program 110. For example, the advertisements selected and provided for an adult driver of the automobile 112 may be different than the advertisements selected and provided for a teenage driver of the same automobile 112, even along the same route. Stated more generically then, either the identity of the driver, the identity of the automobile, or both are taken into consideration when selecting advertisements. Further still, in addition to the identity of the driver and/or automobile, the past and/or current location of the automobile may be taken into consideration when selecting an advertisement to be provided to the driver.

In yet still other embodiments, the advertisement selection program 110 may select one or more advertisements, and provide the advertisements to the onboard device 104 in advance, with instructions and/or criteria of when and/or where to provide the advertisements to the driver. Thus, the final selection of advertisements may be by instructions executed by the processor 116 of the onboard device 104 selecting among a group of possible advertisements.

The specification now turns to illustrative embodiments of identifying the driver of the automobile by the onboard device 104. In some embodiments the identification system 128 directly identifies the driver by gathering some form of biometric information of the driver. For example, in some embodiments the identification system 128 may be a fingerprint scanner. The onboard device 104 may place the automobile in a disabled state (as discussed above) until the driver places her or his finger on the identification device the form of a fingerprint scanner. Once scanned, the onboard device 104 can enable the automobile for use. Thus, with the fingerprint scanned the onboard device 104 has indicia of driver identity that can be kept locally and/or sent to the data center 100. Here again, it is noted that a precise identity of the driver need not be known in all cases. The fact that a unique driver is identified by way of the fingerprint may be sufficient in many embodiments.

As another example of gathering biometric information of the driver, in some embodiments the identification system 128 may be a retinal scanner. The onboard device 104 may place the automobile in a disabled state (as discussed above) until the driver scans her or his retina on the identification device 128 the form of a retinal scanner. Once scanned, the onboard device 104 can enable the automobile for use. Thus, with the retinal scan the onboard device 104 has indicia of driver identity that can be kept locally and/or sent to the data center 100. Here again, it is noted that a precise identity of the driver need not be known in all cases. The fact that a unique driver is identified by way of the retinal scan may be sufficient in many embodiments.

As another example of gathering biometric information of the driver, in some embodiments the identification system 128 may be a voice recognition system. The onboard device 104 may place the automobile in a disabled state (as discussed above) until the driver speaks her or his predetermined word or phrase into the identification device 128 in the form of a voice recognition system. Once recognized, the onboard device 104 can enable the automobile for use. Thus, with the voice recognition the onboard device 104 has indicia of driver identity that can be kept locally and/or sent to the data center 100. Here again, it is noted that a precise identity of the driver need not be known in all cases. The fact that a unique driver is identified by way of the voice recognition system may be sufficient in many embodiments. Thus, not only does the onboard device 104 provide targeting advertisement, but may also serve the function of a theft deterrent device.

It is noted that, with respect to the gathering of biometric information for determining driver identity, the onboard device 104 need not solely make the determination, particularly when the determinations are processor intensive (e.g., voice recognition). That is, in some cases the identification system 128 may gather data, and send the data to a remote computer (e.g., the data center 100) for further processing. For example, data gathered by the identification system 128 may be sent by the onboard device 104 to an identification program 140 executed by computer systems of the data center 100. The identification program, in turn, performs the processor intensive work of identification (e.g., performing voice analysis, analyzing the retinal scan).

Figure 2:
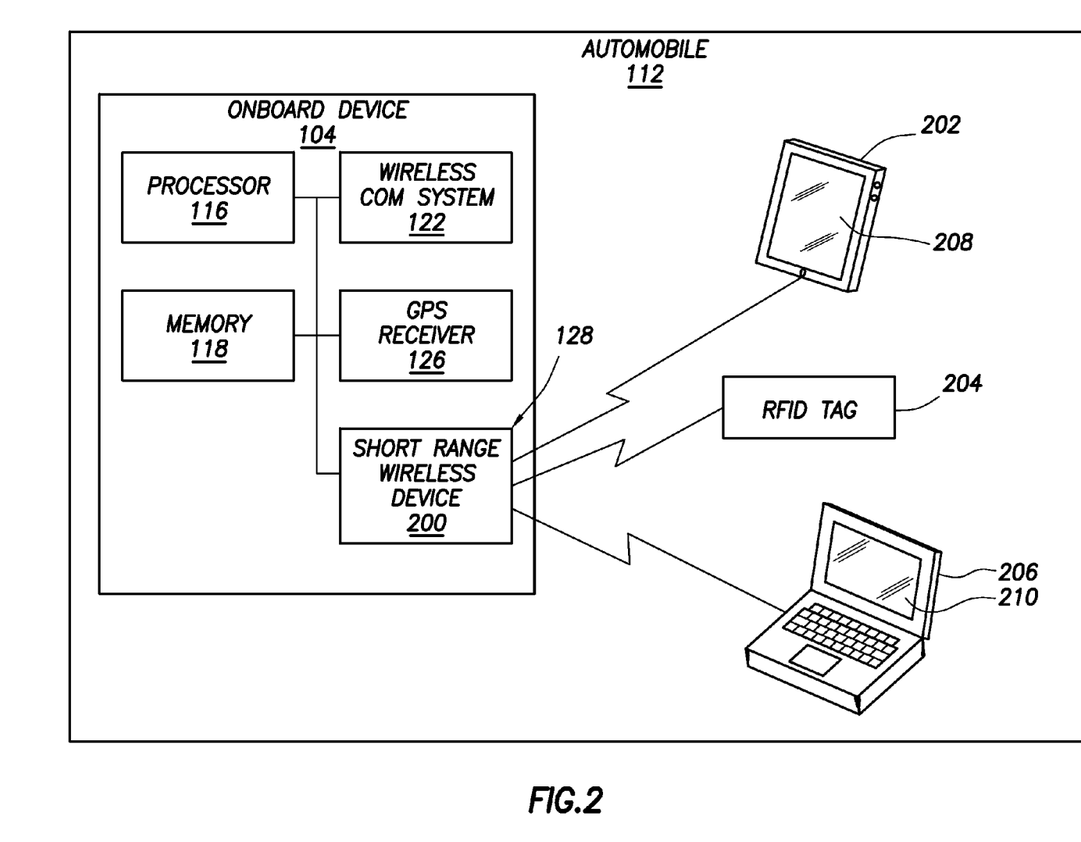
FIG. 2 shows a block diagram of a system in accordance with at least some embodiments.

In yet still other embodiments, identification may be more indirect than reading information directly from the driver. FIG. 2 shows an automobile 112 with an onboard device 104 in accordance with alternative embodiments. In particular, the identification system 128 in the illustrative embodiments is in the form of a short-range wireless device 200. The short-range wireless device 200 may take many forms, but has a limited distance over which communication may take place. The range of over which communication may take place need not extend beyond the passenger compartment of the automobile 112, but because the passenger compartment of an automobile has windows and doors, the range may extend beyond the automobile for a relatively short distance (e.g., two meters). The protocol over which the short-range wireless device 200 communicates may likewise take many forms. In one embodiment, the short-range wireless device 120 implements a Bluetooth communication protocol. Another example protocol includes ZIGBEE® brand network protocols, where the ZIGBEE® trademark is owned by Zigbee Alliance. Regardless of the type of protocol, and range, implemented by the short-range wireless device 200, when the onboard device 104 is installed and remotely located from the data center 100 the short-range wireless device 200 cannot directly communicate with the data center 100 over the short-range wireless device 200 (though communication are still possible over the wireless communication system 122, or through an intervening device).

In accordance with some embodiments, the onboard device 104 identifies the driver by way of the short-range wireless device 200. More particularly, the short-range wireless device 200 may establish communication with a portable electronic device carried by the driver, and thereby identify the driver. That is, assuming that the driver usually carries the same portable wireless device, identifying the presence of the portable wireless device is thus an indirect identification of the driver. Portable wireless devices carried by the driver may take many forms. For example, the portable wireless device may be in the form of a cellular phone or smart phone 202, which smart phone 202 may provide personal digital assistant functionality.

In yet still further embodiments, the portable wireless device may be a radio frequency identification (RFID) tag 204 carried by the driver. For example, the driver may carry an access card for a building (e.g., work, gym) where the access card has an embedded RFID tag. The onboard device 104 may determine the driver identity by establishing communication with the RFID tag 204. In yet still further embodiments, the portable wireless device may be a laptop computer system 206 carried by the driver, where the laptop computer system 206 implements a short range communication system.

In the case of identifying by way of a portable wireless device then, identifying the device may thus indirectly identify the driver. However, these illustrative embodiments shall not be read to require that the full identity (e.g., full name) of the driver could or should be determined from the portable wireless device. In some cases merely knowing that a driver that regularly carries the particular portable wireless device may be sufficient. However, in some cases full identity may be determined, such as by reading the name entered by the user of the smart-phone 202, or perhaps reading a name encoded on the RFID tag 204.

In some embodiments, the only role played by the portable wireless device is assisting in identifying the driver. However, in other embodiments the portable wireless device may provide a more active role in delivery of advertisements to the driver. For example, illustrative smart phone 202 has a display device 208. In some embodiments, the advertisement is provided to the driver by way of a display device 208 of the driver's smart phone 202 (or, for that matter, the display device 210 of the driver's laptop computer system 206). The advertisement displayed may take many forms. In some cases the advertisement is text message (e.g., short messaging service (SMS) text communication, or multimedia messaging service (MMS) communication). That is, rather than delivering the advertisement through the onboard device 104, the data center 100 may send the advertisement directly to the driver's smart phone in the form of a SMS or text message. In yet still other embodiments, the message may take the form of series of packet-based messages (e.g., TCP/IP) exchanged between a program executing on the smart phone 202 and the computer systems of the data center 100 by way of the onboard device 104. That is, the advertisement may be sent from the data center 100, through the wireless communication network 102, through the onboard device 104, and then to the smart phone 202. In yet still further embodiments, the advertisement may be sent directly to the portable wireless device over the wireless communication network 102, and thus not through the onboard device 104.

Having a portable device to which to send advertisements enables yet still further functionality. For example, an electronic coupon for a good or service may be provided to the smart phone 202, where the driver may then carry the smart phone 202 into the establishment as the means to use the coupon. In yet still other embodiments, the data center 100 may send to the smart phone 202 a link to a website at which a coupon can be downloaded.

So as not to unduly complicate the description, the specification to this point has assumed that the driver is identified, and advertisements directed to the driver are provided. However, in further embodiments the identified person need not be the driver. For example, by any of the various mechanisms discussed above, any occupant of the automobile 112 may be identified. Moreover, while the discussion is based on identifying a single individual, in other cases multiple individuals may be identified as being within the automobile. Thus, in these further embodiments, the advertisements provided may be directed to occupants other than the driver. In the particular case of each occupant having a separate portable wireless device (such as each occupant having their own smart phone), the data center 100 may send different advertisements to each occupant, the advertisements selected as discussed above.

Figure 3:
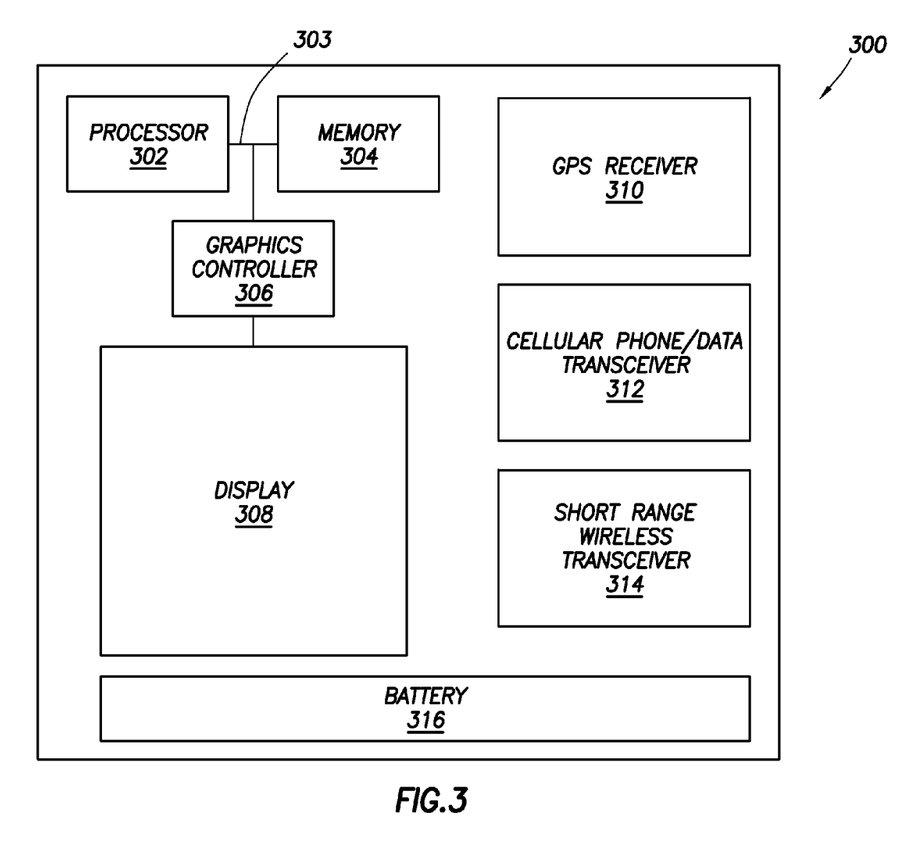
FIG. 3 shows a block diagram of a portable electronic device in accordance with at least some embodiments.

FIG. 3 shows an electrical block diagram of a portable electronic device 300 in accordance with at least some embodiments. The portable electronic device 300 is illustrative of devices that could be carried by the driver of the automobile, such as the smart phone 202. In particular, the portable electronic device 300 comprises a processor 302, memory 304, graphics controller 306, display device 308, global positioning system (GPS) receiver 310, cellular phone/data transceiver 312, short range communication transceiver 314, and battery 316. The processor 302 is coupled to memory 304, such as by a bus 303. The memory 304 stores programs executed by the processor 302, and in some cases may be the working memory for the processor 302. In some cases, the memory 304 may be random access memory (RAM) (e.g., dynamic random access memory (DRAM), flash memory). The memory 304 may store programs used by the portable electronic device for operation, such as a mobile operating system (e.g., iOS™ brand mobile operating system from Apple, Inc., or the ANDROID™ brand mobile operating system from Google, Inc.) and original equipment manufacturer (OEM) installed programs (e.g., applications to implement placing and receiving cellular phone calls, or messaging services).

An occupant who carries the portable electronic device 300 may interface with the various programs executed on the device 300 by way of display device 308. The display device 308 may be any display device upon which text and/or images may be formed, such as a liquid crystal display (LCD). In some cases, the display device is controlled by graphics controller 306, but in other cases the graphics controller functionality may be implemented within the processor 302. Though not specifically shown in FIG. 2, the display device may be overlaid with a transparent touch sensitive device such that the portable wireless device implements "touch screen" functionality.

The illustrative portable electronic device 300 further comprises a GPS receiver 310. The GPS receiver 310 receives signals from an array of GPS satellites orbiting the earth, and based on timing associated with arrival of those signals, a location can be determined. In some cases, the GPS receiver 310 has sufficient functionality to calculate location, and thus the data passed to processor 302 may be a direct indication of location. In other cases, the functionality to determine position may be shared between the GPS receiver 310 and software executing on the processor 302. That is, the GPS receiver 310 may receive the plurality of GPS signals and pass the information to a program on the processor 300, which program may then make the determination as to location of the portable electronic device 300.

Still referring to FIG. 2, the portable electronic device further comprises a cellular phone/data transceiver 312, over which voice and data transmission may take place. The transceiver 312 thus implements a wireless communication system and/or protocol (i.e., radio frequency communication by way of electromagnetic waves propagating through air). Any suitable communication protocol may be implemented by the transceiver 312, such as those implemented by the wireless communication network 102 (FIG. 1). While it is contemplated that in most cases the transceiver 312 will employ both voice and data communications, in some embodiments only a data communication system is implemented (e.g., an IPAD™ brand product available from Apple, Inc.). That is, in some cases the portable electronic device 300 does not provide voice services.

Still referring to FIG. 2, illustrative portable electronic device 300 further comprises a short range communication transceiver 314. By way of the short range communication transceiver 214, programs executed by the processor 302 may communicate with other devices, such as the onboard device 104. The protocol over which the short range communication transceiver 314 communicates may take many forms, but will be compatible with the protocol of the short range wireless communication device 200 of the onboard device 104.

A portable wireless device 300 such as shown in FIG. 3 enables additional functionality. For example, in some embodiments the GPS receiver 310 receives the satellite signals and determines location, and passes the location information to the onboard device 104. Moreover, as mentioned above the advertisements may be directly communicated to the portable electronic device 300 by way of the cellular phone/data transceiver 312, thus providing the advertisement to the driver without the advertisement passing through the onboard device.

Figure 4:
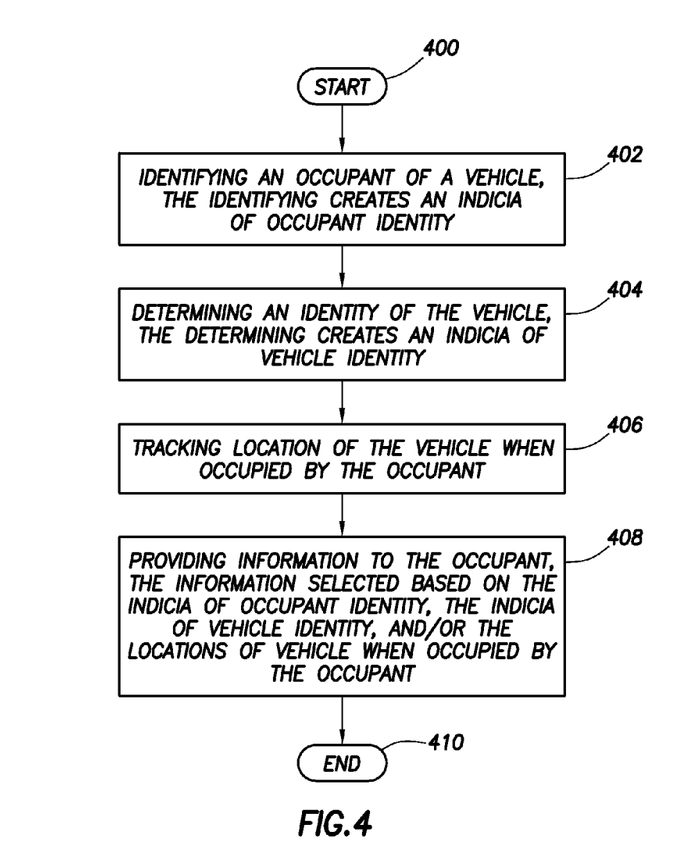
FIG. 4 shows a method in accordance with at least some embodiments.

FIG. 4 shows a method, some of which may be implemented by way of software, in accordance with at least some embodiments. In particular, the method starts (block 400) and comprises: identifying an occupant of a vehicle, the identifying creates an indicia of occupant identity (block 402); determining an identity of the vehicle, the determining creates an indicia of vehicle identity (block 404); tracking location of the vehicle when occupied by the occupant (block 406); and providing information to the occupant, the information selected based on the indicia of occupant identity, the indicia of vehicle identity, and/or the locations of vehicle when occupied by the occupant (block 408). Thereafter, the method ends (block 410), possibly to be re-started.

Figure 5:
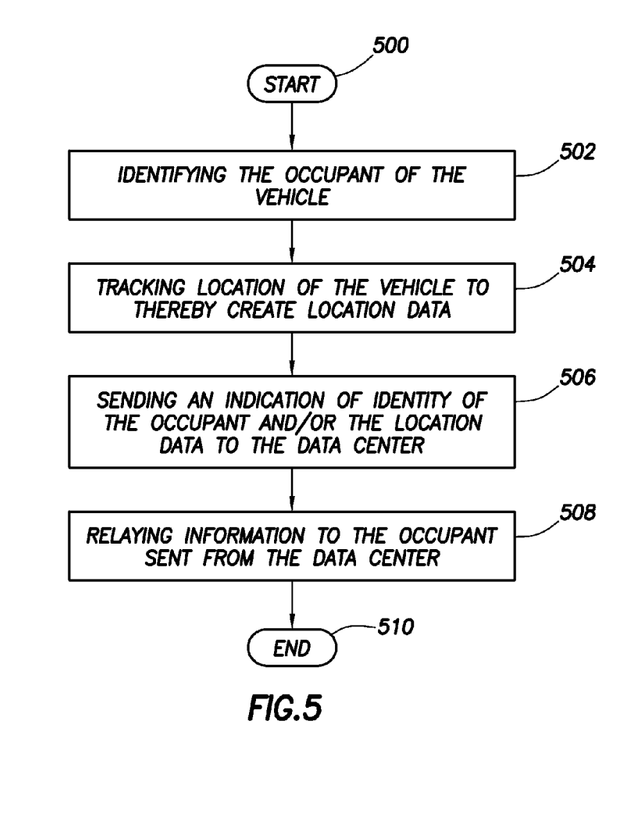
FIG. 5 shows a method in accordance with at least some embodiments.

FIG. 5 shows a method, some of which may be implemented by way of software, in accordance with at least some embodiments. In particular, the method starts (block 500) and comprises: identifying the occupant of the vehicle (block 502); tracking location of the vehicle to thereby create location data (block 504); sending an indication of identity of the occupant and/or the location data to the data center (block 506); and relaying information to the occupant sent from the data center (block 508). Thereafter, the method ends (block 510), possibly to be re-started.

Figure 6:
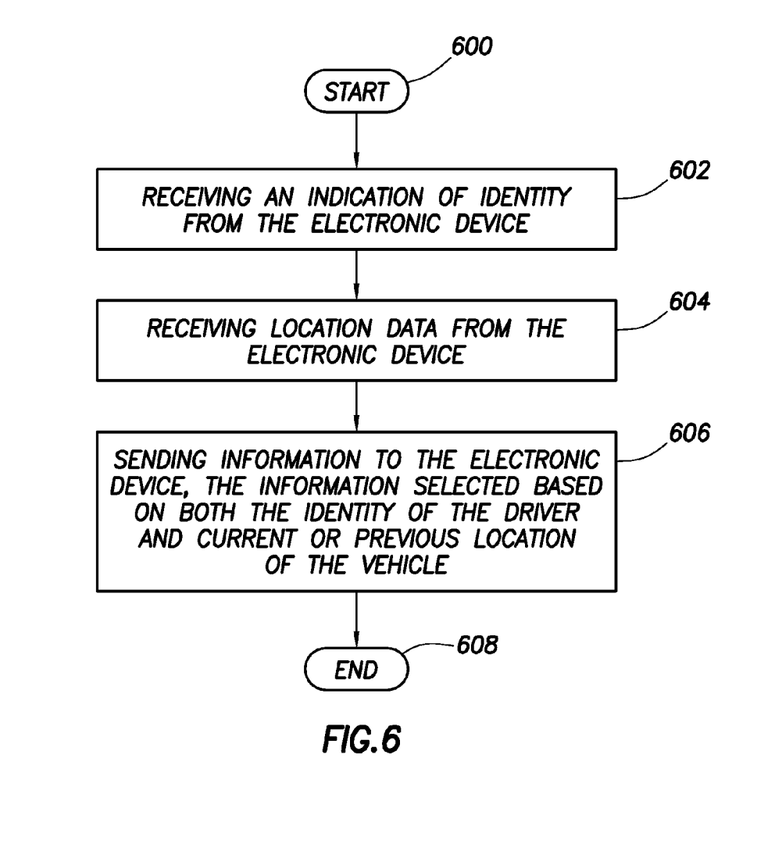
FIG. 6 shows a method in accordance with at least some embodiments.

FIG. 6 shows a method, some of which may be implemented by way of software, in accordance with at least some embodiments. In particular, the method starts (block 600) and comprises: receiving an indication of identity from the electronic device (block 602); receiving location data from the electronic device (block 604); and sending information to the electronic device, the information selected based on both the identity of the driver and current or previous location of the vehicle (block 606). Thereafter, the method ends (block 608), possibly to be re-started.

Figure 7:
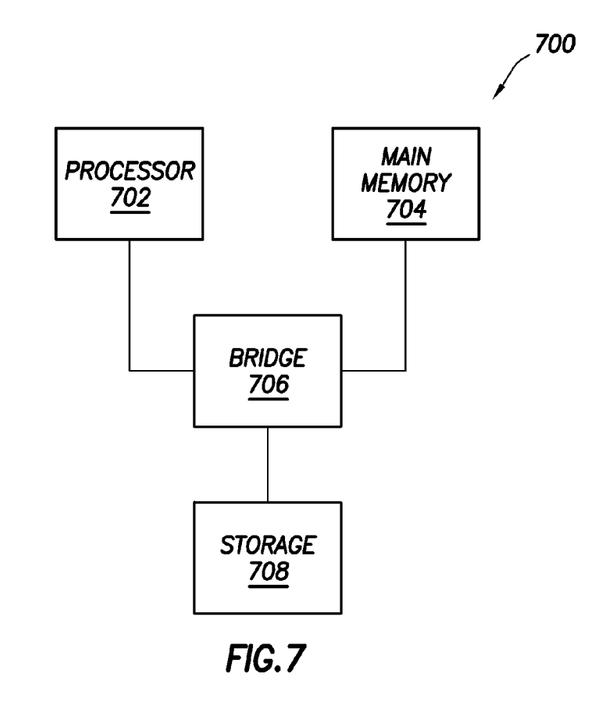
FIG. 7 shows a block diagram of a computer system in accordance with at least some embodiments.

FIG. 7 illustrates a computer system 700 in accordance with at least some embodiments, and upon which at least some of the various embodiments of the data center 100 may be implemented. That is, some or all of the various embodiments may execute on a computer system such as shown in FIG. 7, multiple computers systems such as shown in FIG. 7, and/or one or more computer systems equivalent to the FIG. 7, including after-developed computer systems.

In particular, the computer system 700 comprises a processor 702, and the processor couples to a main memory 704 by way of a bridge device 706. In some embodiments, the bridge device may be integrated with the processor 702. Moreover, the processor 702 may couple to a long term storage device 708 (e.g., a hard drive) by way of the bridge device 706. Programs executable by the processor 702 may be stored on the storage device 708, and accessed when needed by the processor 702. The programs stored on the storage device 708 may comprise programs to implement the various embodiments of the present specification, including storing driver/location information in the driver/location database 108, selecting advertisements from the advertisement database 106, and sending selected advertisements to the onboard device 104. In some cases, the programs are copied from the storage device 708 to the main memory 704, and the programs are executed from the main memory 704. Thus, both the main memory 704 and storage device 708 are considered non-transitory computer-readable storage mediums.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

References to "one embodiment", "an embodiment", "a particular embodiment" indicate that a particular element or characteristic is included in at least one embodiment of the invention. Although the phrases "in one embodiment", "an embodiment", and "a particular embodiment" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method comprising:
identifying an occupant of a vehicle, the identifying by an on-board device coupled to the vehicle by at least one selected from the group consisting of: identifying a portable electronic device carried by the occupant; reading a fingerprint of the occupant; taking a retinal scan of the occupant; and reading a voice print of the occupant, the identifying creates an indicia of occupant identity;
determining an identity of the vehicle, the determining creates an indicia of vehicle identity;
tracking locations of the vehicle where the vehicle has previously stopped when the vehicle was occupied by the occupant; and
providing information to the occupant, the information related to a business at which the vehicle with the occupant has stopped on at least one previous occasion, the information selected based on the indicia of occupant identity, the indicia of vehicle identity, and the locations where the vehicle has previously stopped when the vehicle was occupied by the occupant.

2. The method of claim 1 wherein occupant is at least one selected from the group consisting of: the driver of the vehicle; and a passenger in the vehicle.

3. The method of claim 1 wherein identifying the portable electronic device further comprises communicating with at least one portable electronic device selected from the group consisting of: a cellular telephone; a smart phone; a computer system; a personal digital assistant; and a device comprising a radio frequency identification tag.

4. The method of claim 1 wherein tracking further comprises reading global positioning system (GPS) signals by the portable electronic device.

5. The method of claim 1 wherein identifying further comprises identifying using a portable electronic device carried by the driver.

6. The method of claim 5 wherein identifying by the portable electronic device further comprises identifying by at least one selected from the group consisting of: a cellular telephone; a computer system; a personal digital assistant; and a radio frequency identification (RFID) tag.

7. The method of claim 5 wherein tracking further comprises reading global positioning system (GPS) signals by the portable electronic device.

8. A method comprising:
identifying an occupant of a vehicle, the identifying by way of an on-board device coupled to the vehicle, by reading biometric information from the occupant of the vehicle;
determining an identity of the vehicle, the determining by way of the on-board device, the determining creates an indicia of vehicle identity;
tracking location of the vehicle when occupied by the occupant; and
providing information to the occupant, the information selected based on the indicia of occupant identity, the indicia of vehicle identity, and the locations of vehicle when occupied by the occupant.

9. The method of claim 8 wherein identifying further comprises at least one selected from the group consisting of: reading a fingerprint of the occupant; taking a retinal scan of the occupant; and reading a voice print of the occupant.

10. The method of claim 8 wherein tracking further comprises tracking location by at least one selected from the group consisting of: global positioning system signals; and cellular telephone signals.

11. The method of claim 8 wherein providing information further comprises providing the information to a display device coupled to the vehicle.

12. The method of claim 8 wherein providing information further comprises providing the information to a display device of a portable electronic device carried by the occupant.

13. The method of claim 8 wherein providing information further comprises providing information related to a business along an expected path of travel of the vehicle when the vehicle occupied by the occupant.

14. The method of claim 13 wherein providing information further comprises providing a coupon for a good or service provided by the business.

15. The method of claim 14 wherein providing the coupon further comprises at least one selected from the group consisting of: providing an electronic coupon; and providing a link to website at which the coupon can be downloaded.

16. The method of claim 13 wherein providing information further comprises providing an advertisement for a good or service provided by the business.

17. A system comprising:
a data center comprising a computer system;
an electronic device associated with a vehicle, the electronic device remotely located from the data center, and the electronic device communicatively coupled to the data center, the electronic device comprising:
a processor; and
a memory coupled to the processor;
wherein the memory stores a program that, when executed by the processor, causes the processor to:
identify the driver of the vehicle by causing the processor to at least one selected from the group consisting of: read a fingerprint of the driver; take a retinal scan of the driver; and read a voice print of the driver;
track locations of the vehicle where the vehicle has previously stopped when the vehicle was occupied by the driver to thereby create location data;
send an indication of identity of the driver and the location data to the data center; and
relay information to the driver sent from the data center;
wherein the computer system stores a program that when executed by the computer system causes the computer system to:
receive an indication of identity from the electronic device;
receive location data from the electronic device; and
send information to the electronic device, the information related to a business at which the vehicle with the driver has stopped on at least one previous occasion, the information selected based on both the identity of the driver and the location data.

18. The system of claim 17 wherein the electronic device further comprises a portable electronic device of the driver.

19. The system of claim 18 wherein the portable electronic device further comprises at least one selected from the group consisting of: a cellular telephone; a smart phone; a computer system; a personal digital assistant; and a radio frequency identification (RFID) tag.

20. The system of claim 18 wherein when the program on the memory of the electronic device causes the processor to relay the information, the program on the memory device causes the processor to send the information to a display device physically coupled to the vehicle.

21. The system of claim 18 wherein when the program on the computer system sends, the program causes the computer system to send information related to a business along an expected path of travel of the vehicle.

22. The method of claim 21 wherein when the program on the computer system sends information, the program causes the computer system to send a coupon for a good or service provided by the business.

23. The method of claim 21 wherein when the program on the computer system sends information, the program causes the computer system to send an advertisement for a good or service provided by the business.

24. The method of claim 21 wherein when the program on the computer system sends information, the program causes the computer system to send information related to a business at which the vehicle with the driver has stopped on at least one previous occasion.

25. The system of claim 17 wherein the electronic device further comprises an on-board device physically coupled to the vehicle.

26. The system of claim 25 wherein when the program on the memory of the on-board device causes the processor to relay the information, the program on the memory device causes the processor to send the information to a portable electronic device carried by the driver.

27. The system of claim 25 wherein when the program on the memory of the on-board device causes the processor to relay the information, the program on the memory device causes the processor to send the information by way of a Bluetooth connection.

28. A system comprising:
a processor; and
a memory coupled to the processor;
the memory storing a program that, when executed by the processor, causes the processor to:
create an indication of an identified driver of a vehicle by causing the processor to at least one selected from the group consisting of: read a fingerprint of a driver; take a retinal scan of the driver; and read a voice print of the driver;
track location of the vehicle as driven by the identified driver; and
provide information to the identified driver, the information selected based on the identity of the identified driver and the locations of vehicle when driven by the identified driver; and
disable the vehicle.

29. The system of claim 28 wherein when the processor creates the indication of the identified driver the program causes the processor to communicate with a portable electronic device carried by the driver of the vehicle.

30. The system of claim 28 wherein when the processors provides information the program causes the processor to provide the information to a display device mechanically coupled to the vehicle.

31. The system of claim 28 wherein when the processors provides information the program causes the processor to provide the information to a display device of a portable electronic device carried by the driver.

32. The system of claim 28 wherein when the processors provides information the program causes the processor to provide information related to a business along an expected path of travel of the vehicle when the vehicle is operated by the identified driver.

* * * * *